United States Patent [19]
Sato

[11] Patent Number: 5,383,071
[45] Date of Patent: Jan. 17, 1995

[54] APPARATUS FOR TRACKING CONTROL USING RECORDED PILOT SIGNALS

[75] Inventor: Ichitaro Sato, Kanagawa, Japan

[73] Assignee: Sony Corporation, Tokyo, Japan

[21] Appl. No.: 994,915

[22] Filed: Dec. 22, 1992

[30] Foreign Application Priority Data

Dec. 30, 1991 [JP] Japan .................................. 3-360690

[51] Int. Cl.$^6$ ............................................. G11B 5/584
[52] U.S. Cl. .............................. 360/77.14; 360/77.15
[58] Field of Search ......................... 360/77.14, 77.15

[56] References Cited

U.S. PATENT DOCUMENTS

4,658,309  4/1987  Yasuda et al. ..................... 360/77.14
4,905,108  2/1990  Otokawa ............................. 360/77.14

Primary Examiner—W. R. Young
Assistant Examiner—Varsha A. Rapadia
Attorney, Agent, or Firm—William S. Frommer; Alvin Sinderbrand

[57] ABSTRACT

A tracking control apparatus is capable of decreasing sufficiently the effects of crosstalks in effectively utilizing the azimuth angle by tracking controlling the magnetic head in order that the scanning position of the magnetic head will be deviated to the prescribed direction and quantity. In case of tracking controlling the magnetic head depending upon the first and second error signals formed in order to correspond to the frequency difference element between the pilot signal of the adjacent recording track and the pilot signal of the scanning recording track, since the first and second error signals are to be weighted with the prescribed ratio, the scanning position of the magnetic head can be deviated to the position where the crosstalk of the reproducing signals can be sufficiently decreased for practical use.

12 Claims, 5 Drawing Sheets

APPARATUS FOR TRACKING CONTROL USING RECORDED PILOT SIGNALS

BACKGROUND OF THE INVENTION

FIELD OF THE INVENTION

This invention relates to a tracking controlling apparatus, and more particularly to improvement of a data recording/reproducing apparatus using an automatic track following system, in which a recorded pilot signal is reproduced from a data recording track formed on a recording medium by a reproducing head which is controlled to track to a reproducing track based on the reproduced pilot signal.

DESCRIPTION OF THE PRIOR ART

Conventionally, in a data recording/reproducing apparatus, for example, a digital video tape recorder, recording tracks are helically formed to successively on a magnetic tape by use of a magnetic head mounted on a rotary drum. In a digital video tape recorder using an azimuth recording method, recording tracks are successively formed by alternately using a plurality of magnetic heads with different angles, to reduce an influence by crosstalk signals obtained from adjacent tracks in reproducing.

Tracking control in a digital video tape recorders uses an automatic tracking following system (ATF system), as disclosed in U.S. Pat. Nos. 4,594,615 and 4,658,309. The ATF system is one of the phase servo systems in a capstan control system of a digital video tape recorder. For example, four pilot signals different in frequency from each other are cyclically recorded with video information on recording tracks, and a tracking control signal is obtained by detecting a difference between the pilot signals picked up from adjacent tracks in reproducing a data signal, so that the tracking control is executed by using the tracking control signal.

Figure 1:
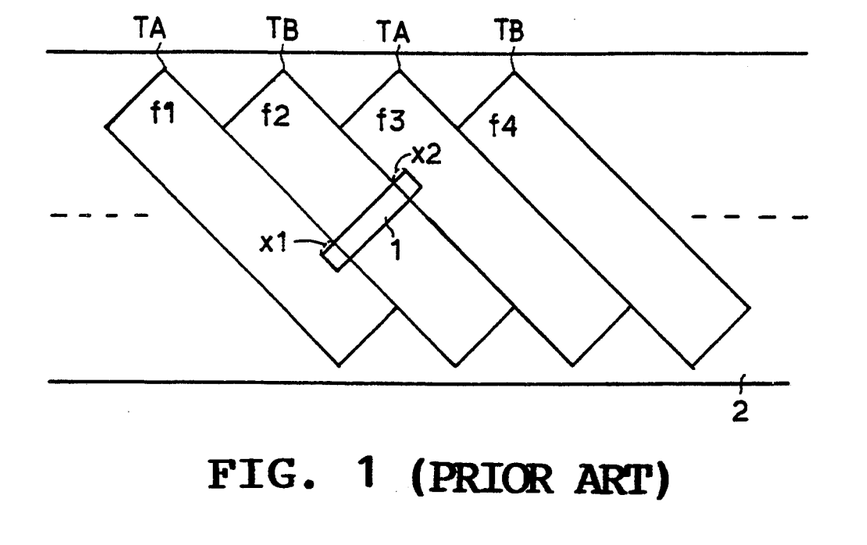
FIG. 1 is a schematic diagram illustrating a trace condition of the reproducing head 1 according to the conventional tracking control.

That is, as shown in FIG. 1, a magnetic head 1 detects pilot signals f1 and f3 which are recorded on recording tracks TA preceding and following from the recording track to be tracked in the reproducing mode.

The signal levels of detected pilot signals f1 and f3 are proportioned to values of protruding widths x1 and x2 toward the preceding and following tracks TA.

As a result, the digital video tape recorder tracking-controls the magnetic head 1 so as to make signal levels of the pilot signal f1 and f3 equal to each other position. Thus, the magnetic head 1 becomes locked in a tracking.

As a result, in such a conventional tracking control system, the magnetic head 1 is controlled to protrude to the preceding and following tracks equally, so that the center of the magnetic head 1 traces sequentially the center portion of the recording tracks. Therefore, the conventional tracking control system has a disadvantage that it cannot minimize an influence of crosstalk from the video signals of the adjacent tracks.

The above method can easily make the magnetic head track precisely trace to the center of each of the recording tracks, but it is difficult for the reproducing head to track in a lock position and deviate from each of the recording tracks when necessary, when in tracking the reproducing head to a desired track in after-recording, or when in measuring an amount of crosstalk to an amount of tracking deviation in adjusting a video tape recorder.

U.S. Pat. No. 4,658,309, discloses a tracking control apparatus of an ATF system which can be easily made to deviate from a tracking lock point.

In this Patent, the pilot signals of tracks adjacent to each other are detected, in reproducing the data signal. First and second error signals are obtained from detected pilot signals. Each obtained error signal is multiplied by coefficient n. The obtained error signal and coefficient n multiplied error signal are selected by means of corresponding switching circuits, which select either the first and second error signals when tracking, or the coefficient n multiplied error signal, obtained from the track of opposite direction against the direction to be deviated, when tracking from the lock position to the deviated position.

However, with the above tracking control apparatus which can deviate from a tracking lock point, the tracking lock point is deviated by merely multiplying the error signal by a weighting coefficient as occasion demands, but it cannot minimize an influence of crosstalk of video signals obtained from adjacent tracks.

SUMMARY OF THE INVENTION

In view of the foregoing, an object of this invention is to provide a tracking control apparatus of an information recording/reproducing system in which a magnetic head is tracking-controlled so as to deviate the scanning position of the magnetic head in a predetermined direction by a predetermined amount, and the effects of crosstalks is effectively reduced by utilizing an azimuth angle.

The foregoing objects and other objects of the invention have been achieved by the provision of the tracking control apparatus 1 and 40 in which the first and second error signals S11 and S12 are formed corresponding to the differential frequency elements ΔfA and ΔfB denoting the difference between the frequency of pilot signals f1 to f4 obtained from recording tracks TA or TB to be scanned and between the frequency of pilot signals f1 to f4 obtained from the recording tracks TB or TA adjacent to the both sides of said recording tracks TA or TB to be scanned, by successively scanning by means of magnetic head 1A and 1B the recording tracks TA and TB formed helically to arrange successively in a longitudinal direction on the magnetic recording medium 2 and between the recorded pilot signals f1 to f4 of different frequencies. Tracking error signal S13 is generated for tracking-controlling the magnetic heads 1B and 1A so as not to produce differences between the first and second error signals S11 and S12, wherein: the magnetic heads 1 and 1A have wider head widths than the widths of recording tracks of TA and TB, and said first and second error signals are weighted by error signal weighting means with the prescribed ratio K1 and K2, to make said magnetic head move to desired tracking position, whereby the scanning positions of the magnetic heads 1A and 1B to recording tracks TA and TB is made to deviate by a deviation amount and for a deviation direction determined on the basis of predetermined ratios K1 and K2.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

(1) First Embodiment

Figure 2:
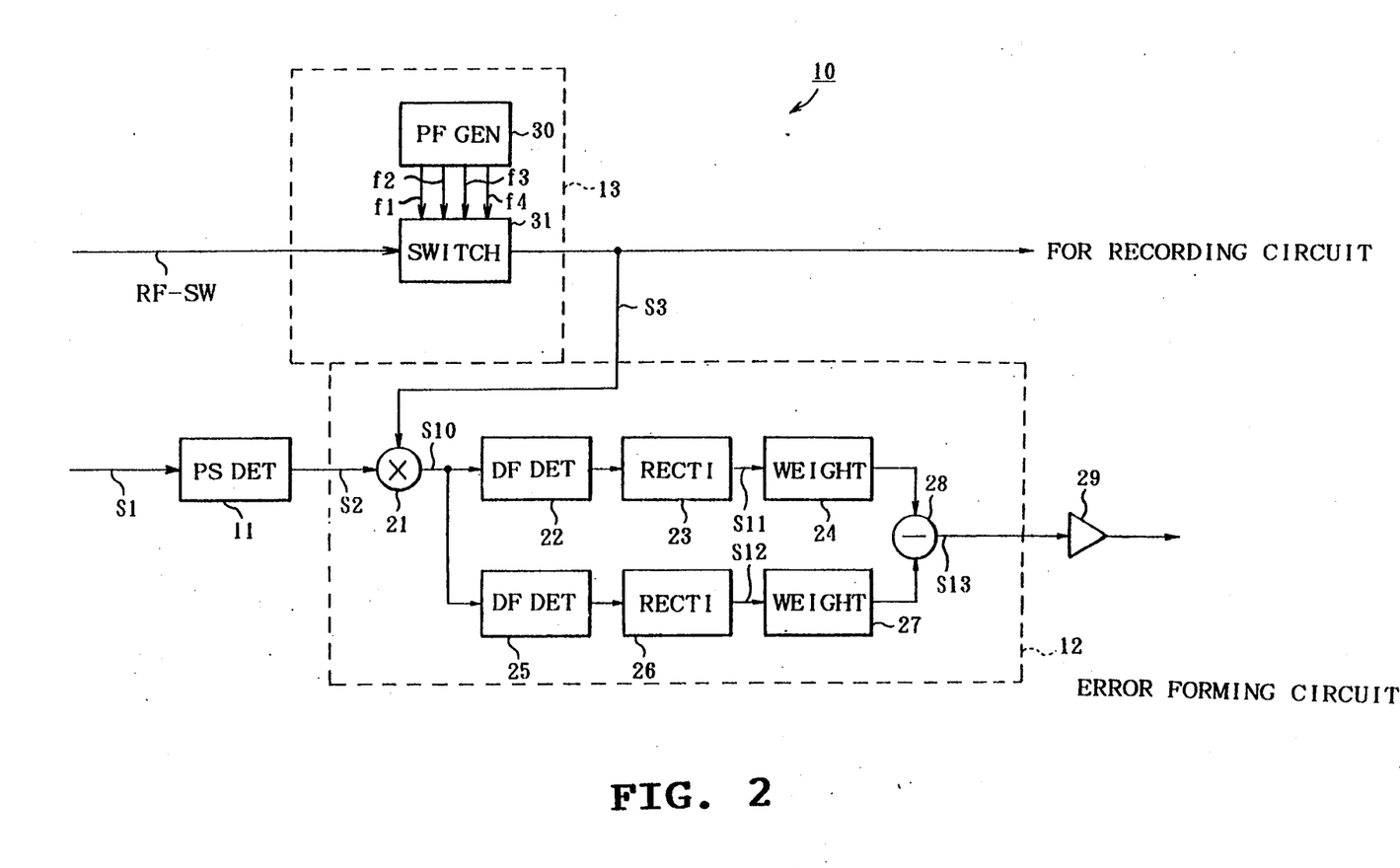
FIG. 2 is a schematic diagram illustrating a tracking error signal forming system according to one embodiment of the present invention.
Figure 3:
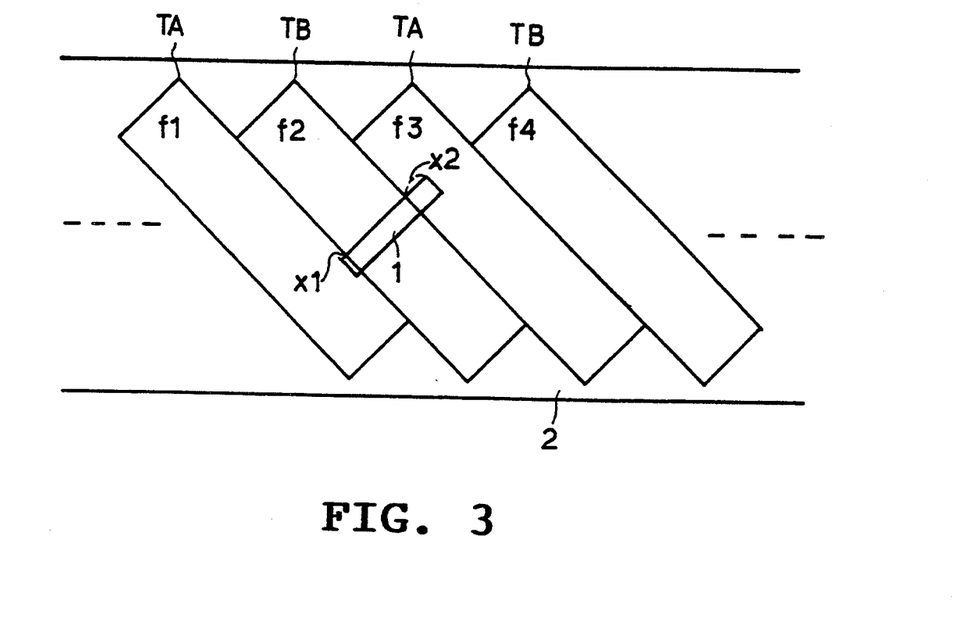
FIG. 3 is a schematic diagram showing a trace condition of the reproducing head 1 according to the tracking control of the present invention.

In FIGS. 2 and 3 in which the identical reference numerals are given with the corresponding parts of FIG. 1. Numeral 10 generally designates a digital video tape recorder having first and second exclusively reproducing heads 1 with wider head width as compared with the recording head.

In the first and second reproducing heads, the reproducing tracks which are helically formed successively on the magnetic tape will be alternately traced.

After a part of the picture data reproduced from a tape 2 by the first reproducing head 1 is supplied to a pilot signal detection circuit 11 as a reproducing output signal S1, the pilot signal element is extracted as a reproducing pilot signal S2 and is supplied to a multiplier 21 of the error forming circuit 12 as the first multiplying input.

At this point, as shown in FIG. 3, four kinds of pilot signals f1 to f4 with different frequencies are recorded on each recording track of the tape 2 with the video signals successively in a cyclic manner.

The pilot signals f1 to f4 will be selected at the value to satisfy the following equations:

$$\Delta fA = |f_1 - f_2| = |f_3 - f_4| \quad (1)$$

$$\Delta fB = |f_2 - f_3| = |f_1 - f_4| \quad (2)$$

and thus, the difference frequencies of pilot signal elements between the preceding and following tracks are arranged to become $\Delta fA$ and $\Delta fB$ respectively.

A reference signal having the same frequency as those of the pilot signal f1 or f3 of the objective track TA as a reference pilot signal S3 is supplied from a reference signal generation circuit 13 to a multiplier 21 as a second multiplying input.

With this arrangement, the multiplier 21 obtains a multiplying output signal S10 comprising different frequencies $\Delta fA$ and $\Delta fB$ respectively, and supplies to the first and second difference frequency detection circuits 22 and 25 respectively.

The first difference frequency detection circuit 22 extracts the signal element of the difference frequency $\Delta fA$ from the multiplying output signal S10 and after supplying this to a rectifying circuit 23 and converting to a DC level error signal S11, supplies to a first weighting circuit 24.

Similarly, the second difference frequency detection circuit 25 extracts the signal element of the difference frequency $\Delta fB$ from the multiplying output signal S10 and after supplying to a rectifying circuit 26 and converting to a DC level second error signal S12, supplies to a second weighting circuit 27.

Moreover, the weighting circuits 24 and 27, upon level shifting the signal levels of the first and second error signals S11 and S12 to the prescribed respective weighting ratios K1 and K2 times, output to a subtraction circuit 28.

Figure 4:
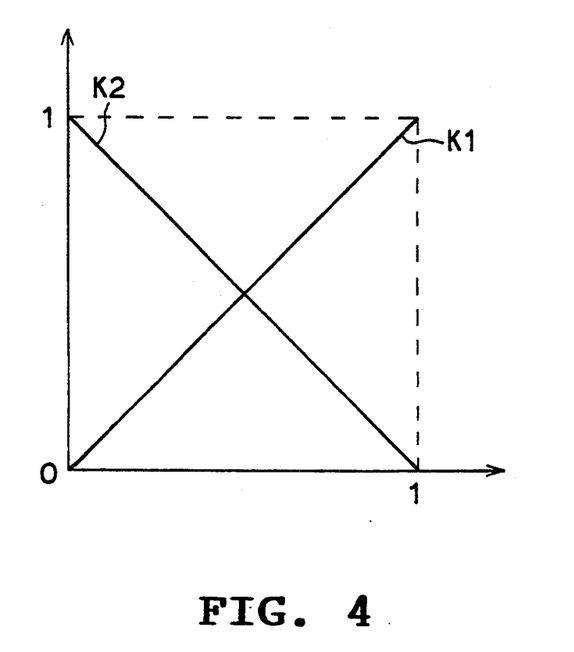
FIG. 4 is a correlation diagram showing the relation between conversion rates K1 and K2.

The weighting ratios K1 and K2, as shown in FIG. 4, can be variable within the range of 0 to 1 and the sum will be 1.

With this arrangement, the subtracter 28 obtains a tracking error signal S13 which becomes 0 level at the time when K1 times the signal level of difference frequency $\Delta fA$ is equal to K2 times the signal level of the difference frequency $\Delta fB$ by subtracting the signal level of the second error signal S12 from the signal level of the first error signal S11, and outputs to a phase servo circuit (not shown in figure) of a capstan servo loop as a corrective signal via an output amplifier 29.

With this arrangement, in the digital video tape recorder 10, the phase servo circuit controls the running speed of the magnetic tape 2 in order that the ratio of protruded widths x1 and x2, x1: x2, will be equal to the weighting ratio K2 and K1, K2: K1.

In case of this embodiment, in the digital video tape recorder 10, it is arranged that the weighting ratio K1 becomes larger than the weighting ratio K2, and thus the magnetic head 1 will be deviated toward the preceding track side, i.e., offsetted.

In this case, the azimuth loss L of the data signal obtained from the preceding track can be expressed as the following equation:

$$E_c = 20 \log_{10} \left| \frac{\sin\left(\frac{\pi x_2}{\lambda} \tan\theta\right)}{\frac{\pi x_2}{\lambda} \tan\theta} \right| \quad (3)$$

where, the azimuth angle of the first and second heads is $\theta$, and the recording wavelength of respective pilot signals is $\lambda$.

Accordingly, in the case where the azimuth angle is small, using the following equation:

$$\tan\theta \approx \sin\theta \approx \theta \quad (4)$$

the equation (3) can approximate to the following:

$$20 \log_{10} \frac{\sin \frac{\pi x_2 \theta}{\lambda}}{\frac{\pi x_2 \theta}{\lambda}} \quad (5)$$

Figure 5:
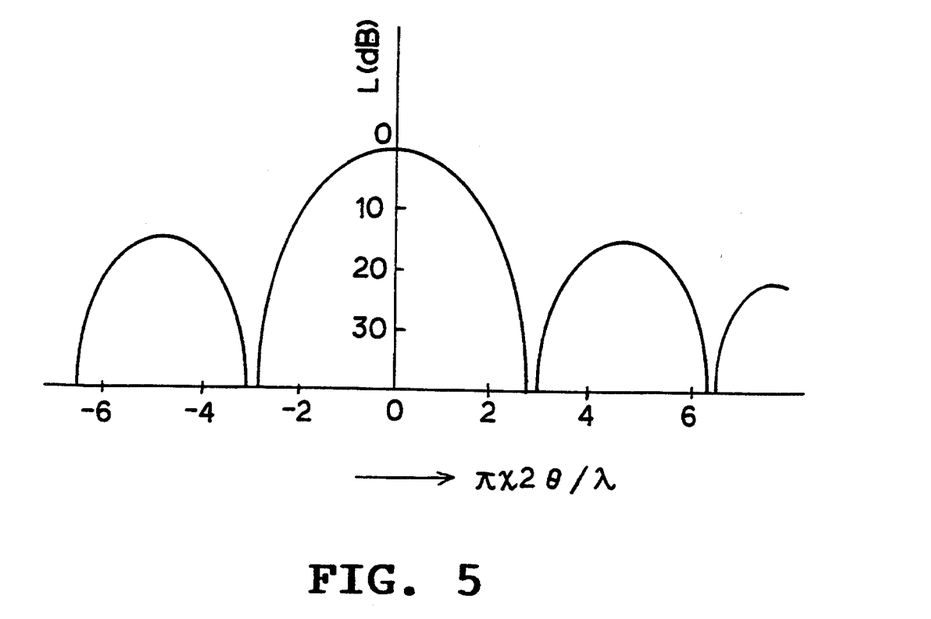
FIG. 5 is a characteristic curve showing the protruded width of the reproducing head 1 and the azimuth loss thereof.

Accordingly, there is a relationship between the azimuth loss Ec and the value of following equation $$\frac{\pi x_2 \theta}{\lambda} \quad (6)$$

as shown in FIG. 5 with a characteristic curve, that generally the azimuth loss L will be larger as the protruded width x2 becomes larger, when, the azimuth angle θ is constant.

Accordingly, in this case, the head 1 is offset in order to make the protruded width x1 toward the following track as small as possible and make the protruded width x2 toward the preceding track as large as possible, therefore the quantity of crosstalk from the preceding track will be larger and the quantity of crosstalk from the following track will be decreased as compared with the state of the centered fixed tracking position. Thus, as a whole, the crosstalk from the adjacent track can be decreased as compared with the fixed tracking position.

However, realistically the curvatures occur on the recording tracks depend upon the drum span of the rotary drum and processing precision, etc. Therefore, the of protruding width x1 will be determined by how much marginal tracking errors will be afforded, and it follows that the protruding widths x1 and x2 have limits.

Accordingly, in this embodiment as shown in FIG. 5, if the following equation:

$$\frac{\theta x_2}{\lambda} = 1 \qquad (7)$$

is an integer number, in utilizing that the azimuth loss L gets to the maximum value (hereinafter referred to null point), the value of weighting ratios K1 and K2 will be set in order that $\Theta x_2/\lambda = 1$ gets nearer to the first Null point as possible, i.e., the $x_2/\lambda = 1$ gets as close as possible to the valve 1.

According to the foregoing construction, the pilot signal detection circuit 11 extracts the pilot signal element from the reproducing signal to be outputted from the magnetic head 1 and supplies to the difference frequency detection circuits 22 and 25 as the multiplying output signal S10 via the multiplier 21.

The difference frequency detection circuits 22 and 25, after extracting the difference frequency ΔfA and ΔfB elements from the multiplying output signal S10, respectively, supply error signals S11 and S12 to the respective weighting circuits 24 and 27 via the rectifying circuits 23 and 26. The weighting circuits 24 and 27 output the error signals S11 and S12 level shifted by K1 and K2 times to the subtraction circuit 28.

The subtracting circuit 28 subtracts the weighted error signal S12 from the weighted error signal S11 and at the time when K1 times of the signal level of difference frequency ΔfA and K2 times of the signal level of the difference frequency ΔfB become equal. Thereafter, subtraction circuit 28 supplies the tracking error signal S13 which would come to the 0 level, to the phase servo circuit of the capstan servo loop via the output amplifier 29.

With this arrangement, the phase servo controls the running speed of the magnetic tape 2 in order that the ratio x1:x2 which are the protruding widths toward the preceding and following tracks x1 and x2 of the magnetic head 1 becomes equal to the inverse ratio K2:K1 of the weighting ratio K1 and K2 depending upon said tracking error signal S13; and thus, the crosstalk quantity from the adjacent tracks can be decreased as compared with the centered fixed tracking position.

(2) Second Embodiment

Figure 6:
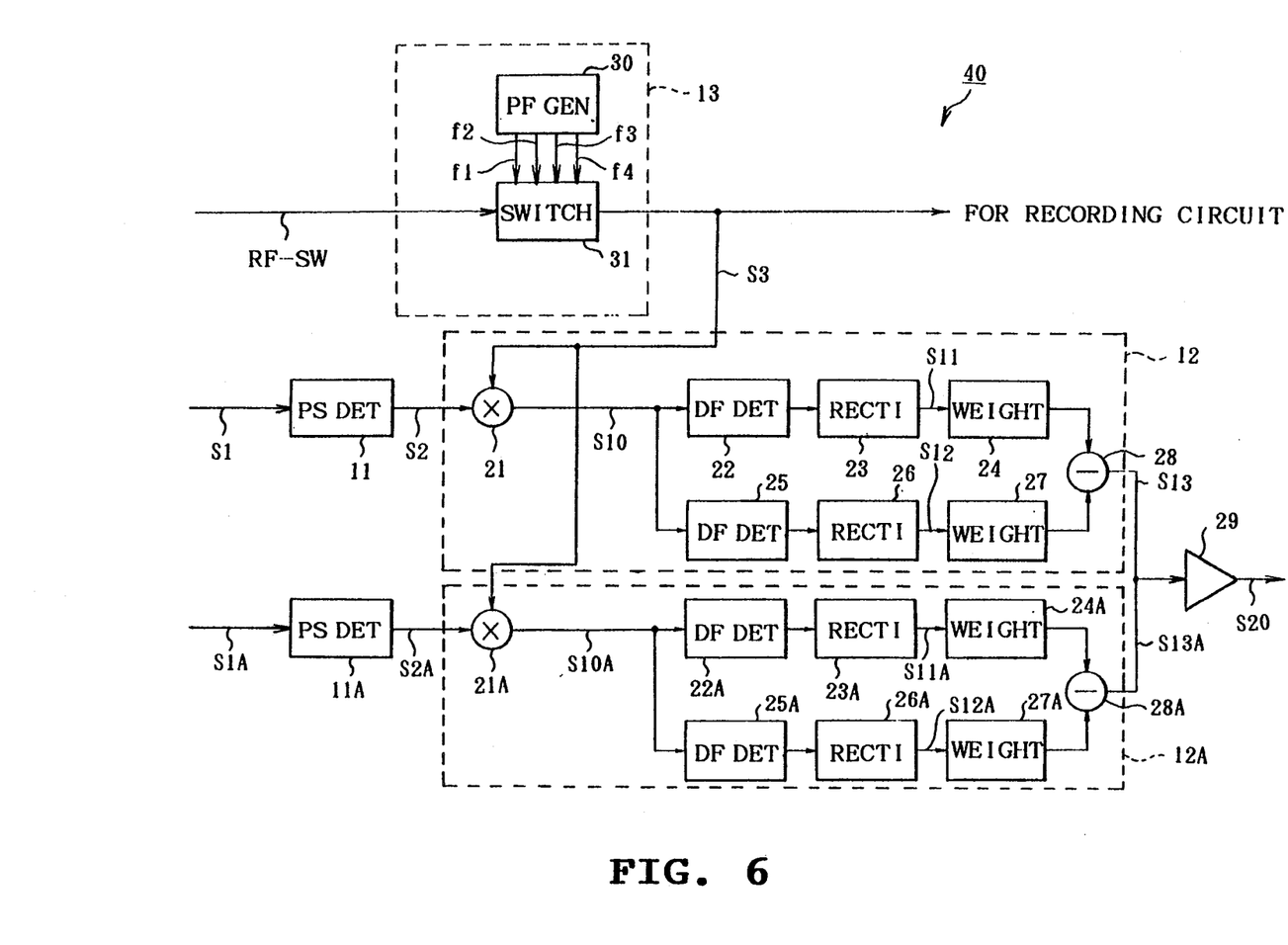
FIG. 6 is a block diagram showing a tracking error signal forming system according to the second embodiment.

In FIG. 6 wherein corresponding parts of FIG. 2 are given the same reference numerals with 40 generally shows a digital video tape recorder according to the second embodiment having the first and second error signal forming circuits 12 and 12A.

The first error signal forming circuit 12, as described above in FIG. 1, after forming the first tracking error signal S13 depending upon the reproducing output signal to be outputted via the first reproducing head, outputs to the output amplifier 29.

On the other hand, the second error signal forming circuit 12A which is constituted by the same construction as to those of the first error signal forming circuit 12, forms the second tracking error signal S13A depending on the reproducing output signal S1A to be outputted via the second reproducing head 1A and outputs to the output amplifier 29.

According to the construction of the second embodiment in FIG. 6, since the tracking control signal will be generated depending upon the pilot signals to be obtained respectively from two magnetic heads which are alternately scanning, the preciseness in tracking can be further improved as compared with the case of tracking controlling by one magnetic head.

(3) Other Embodiments

The first and second embodiments described above have dealt with the case of applying the present invention to the digital video tape recorders 10 and 40 having the exclusively reproducing heads 1 and 1A. However, the present invention is not only limited to the above but also suitably applied to the digital video tape recorder having the magnetic head which can be used both in reproducing and recording.

Furthermore, the first and second embodiments described above have dealt with the case of applying the present invention to the digital video tape recorder. However, the present invention is not only limited to the above but also widely applicable to the magnetic reproducing apparatus which reproduces various signals from the recording tracks formed on the magnetic tape.

Moreover, the first and second embodiments described above have delay with the case of offsetting the magnetic head toward the preceding side. The present invention is not, however, only limited to the above but the same effect can be achieved if the magnetic head is offsetted toward the succeeding side.

Figure 7:
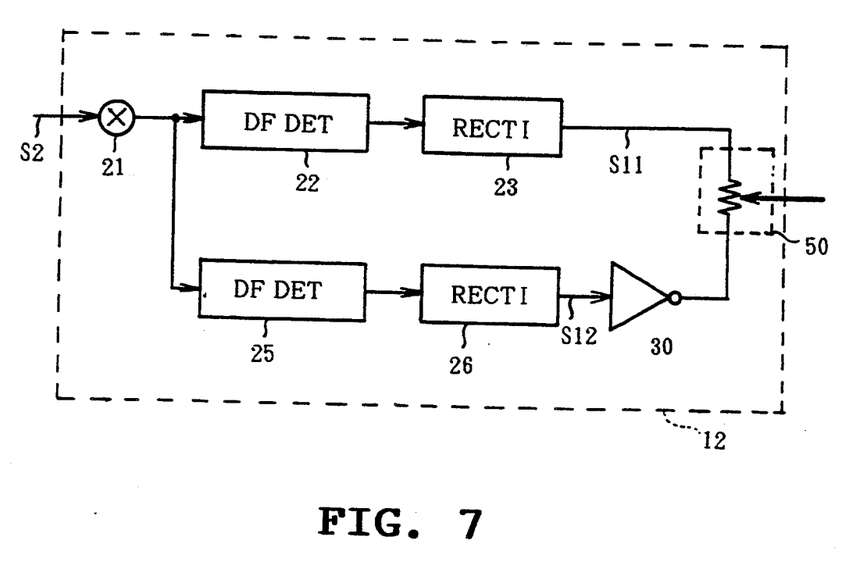
FIG. 7 is a block diagram showing modifications of this invention.

Furthermore, the first and second embodiments described above have dealt with the case of weighting the error signals S11 and S12 in utilizing the weighting circuits 24 and 27. The present invention is not, however, only limited to the above but the rectifying circuits 23 and 26 may be connected with the variable resistance 50 as shown in FIG. 7.

Furthermore, the pilot signal recorded in each track, is may be recorded to every portion on the recording track.

While there has been described in connection with the preferred embodiments of the invention, it sill be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A tracking control apparatus for controlling a tracking position of a reproducing head which reproduces signals recorded as a series of oblique parallel tracks on a recording medium, each of said tracks containing a pilot signal recorded therein having mutually different frequencies in adjacent tracks, said frequencies changing in cyclic sequence from track to track, said reproducing head having a sufficient length to extend across a target track to be reproduced and to overlap portions of adjacent tracks which are in preceding and following relations, respectively, to said target track, said tracking control apparatus comprising:

means for producing first and second control signals which are respectively indicative of opposite displacements of said reproducing head from a track to be traced;

first and second weighting circuits exhibiting first and second weighting coefficients K1 and K2, respectively, K1 and K2 being variable values;

means for calculating the values of said first and second weighting coefficients K1 and K2, respectively, such that the values of K1 and K2 selectively vary within a range of '0' to '1', where (K1+K2=1), and such that the relationship ($\theta \cdot X_2/\lambda$) approaches 1 and $X_2:X_1=K1:K2$, where $\theta$ is an azimuth angle of first and second recording heads that recorded said oblique parallel tracks, $\lambda$ is the recording wavelength, $X_2$ is the length by which said reproducing head overlaps said preceding track and $X_1$ is the length by which said reproducing head overlaps said following track;

means for multiplying said first and second control signals by said first and second weighting coefficients, respectively, to produce first and second weighted control signals, respectively; and     means for generating a tracking error signal from said first and second weighted control signals so that said reproducing head is disposed in a tracking position according to said tracking error signal.

2. The tracking control apparatus according to claim 1, wherein said means for producing said control signals includes:

means for generating reference pilot signals having frequencies that are the same as pilot signals recorded in said tracks to be reproduced;

means for extracting said pilot signals from said tracks that are reproduced;

means for multiplying a reference pilot signal with said extracted pilot signal and for producing a multiplication signal that includes a difference between a frequency component of said extracted pilot signal and a frequency component of said reference pilot signal; and     means for detecting first and second difference frequencies in said multiplication signal and producing corresponding first and second difference frequency signals.

3. The tracking control apparatus according to claim 2, wherein said means for generating said tracking error signal includes means for subtracting said second difference frequency signal from said first difference frequency signal.

4. The tracking control apparatus according to claim 1, wherein said tracking error signal is applied to a phase servo loop which controls the running speed of said recording medium according to said relationship as ($\theta \cdot X_2/\lambda$)→1.

5. The tracking control apparatus according to claim 1, wherein said reproducing head overlaps a substantially greater portion of said preceding track than of said following track, thereby reducing crosstalk between adjacent tracks.

6. A tracking control apparatus that includes first and second tracking control units for controlling a tracking position of first and second reproducing heads, respectively, which reproduce sequential and alternate signals recorded as a series of oblique parallel tracks on a recording medium, each of said tracks containing a pilot signal recorded therein having mutually different frequencies in adjacent tracks, said frequencies changing in cyclic sequence from track to track, each of said first and second reproducing heads having a sufficient length to extend across respective target tracks to be reproduced and to overlap portions of adjacent tracks which are in preceding and following relations to each respective target track, said tracking control apparatus comprising:

means for producing in said first tracking control unit, first and second control signals which are respectively indicative of opposite displacements of said first reproducing head from a track to be traced;

means for producing in said second tracking control unit, third and fourth control signals which are respectively indicative of opposite displacements of said second reproducing head from a track to be traced;

first and second weighting circuits exhibiting first and second weighting coefficients K1 and K2, respectively, K1 and K2 being variable values;

third and fourth weighting circuits exhibiting third and fourth weighting coefficients K3 and K4, respectively, K3 and K4 being variable values;

means for calculating the values of said first and second weighting coefficients K1 and K2, respectively, such that the values of K1 and K2 selectively vary within a range of '0' to '1', where (K1+K2=1), and such that the relationship ($\theta \cdot X_2/\lambda$) approaches 1 and $X_2:X_1=K1:K2$, where $\theta$ is an azimuth angle of first and second recording heads that recorded said oblique parallel tracks, $\lambda$ is the recording wavelength, $X_2$ is the length by which said first reproducing head overlaps said preceding track and $X_1$ is the length by which said first reproducing head overlaps said following track;

means for calculating the values of said third and fourth weighting coefficients K3 and K4, respectively, such that the values of K3 and K4 selectively vary within a range of '0' to '1', where (K3+K4=1), and such that the relationship ($\theta \cdot X_4/\lambda$) approaches 1 and $X_4:X_3=K3:K4$, where $\theta$ is an azimuth angle of first and second recording heads that recorded said oblique parallel tracks, $\lambda$ is the recording wavelength, $X_4$ is the length by which said second reproducing head overlaps said preceding track and $X_3$ is the length by which said second reproducing head overlaps said following track;

means for multiplying said first, second, third and fourth control signals by said first, second, third and fourth weighting coefficients, respectively, to produce first and second weighted control signals in said first tracking control unit and third and fourth weighted control signals in said second tracking control unit; and     means for generating a first tracking error signal and a second tracking error signal from said first and second weighted control signals and said third and fourth weighted control signals, respectively, so that said first reproducing head is disposed in a tracking position according to said first tracking error signal and said second reproducing head is disposed in a tracking position according to said second tracking error signal.

7. The tracking control apparatus according to claim 6, wherein said means for producing said control signals in said first and second tracking control units, respectively, includes:
  means for generating first reference pilot signals having frequencies that are the same as pilot signals recorded in said tracks to be reproduced in accordance with said first tracking control unit and second reference pilot signals having frequencies that are the same as pilot signals recorded in said tracks to be reproduced in accordance with said second tracking control unit;
  means for extracting said pilot signals from said tracks that are reproduced in accordance with said first and second tracking control units, respectively;
  means for multiplying respective ones of said first and second reference pilot signals with respective ones of said extracted pilot signals and for producing first and second multiplication signals, respectively, each including a difference between a frequency component of a respective extracted pilot signal and a frequency component of a respective reference pilot signal; and
  means for detecting first and second difference frequencies in said first multiplication signal and third and fourth difference frequencies in said second multiplication signal to produce corresponding first and second difference frequency signals and corresponding third and fourth difference frequency signals, respectively.

8. The tracking control apparatus according to claim 7, wherein said means for generating said first and second tracking error signals includes means for subtracting said second and fourth difference frequency signals from said first and third difference frequency signals, respectively.

9. The tracking control apparatus according to claim 6, wherein said first and second tracking error signals are applied to a phase servo loop which controls the running speed of said recording medium according to said relationship as $(\theta \cdot X_2/\lambda) \rightarrow 1$.

10. The tracking control apparatus according to claim 6, wherein each of said first and second reproducing heads overlaps a substantially greater portion of the track which is in preceding relation to the respective target track than of the track which is in following relation to said respective target track, thereby reducing crosstalk between adjacent tracks.

11. A tracking control method for controlling a tracking position of a reproducing head which reproduces signals recorded as a series of oblique parallel tracks on a recording medium, each of said tracks containing a pilot signal recorded therein having mutually different frequencies in adjacent tracks, said frequencies changing in cyclic sequence from track to track, said reproducing head having a sufficient length to extend across a target track to be reproduced and to overlap portions of adjacent tracks which are in preceding and following relations, respectively, to said target track, said tracking control method comprising the steps of:
  producing first and second control signals which are respectively indicative of opposite displacements of said reproducing head from a track to be traced;
  generating first and second weighting coefficients K1 and K2, respectively, K1 and K2 being variable values;
  calculating the values of said first and second weighting coefficients K1 and K2, respectively, such that the values of K1 and K2 selectively vary within a range of '0' to '1', where (K1+K2=1), and such that the relationship $(\theta \cdot X_2/\lambda)$ approaches 1 and $X_2:X_1=K1:K2$, where $\theta$ is an azimuth angle of first and second recording heads that recorded said oblique parallel tracks, $\lambda$ is the recording wavelength, $X_2$ is the length by which said reproducing head overlaps said preceding track and $X_1$ is the length by which said reproducing head overlaps said following track;
  multiplying said first and second control signals by said first and second weighting coefficients, respectively, to produce first and second weighted control signals, respectively; and
  generating a tracking error signal from said first and second weighted control signals so that said reproducing head is disposed in a tracking position according to said tracking error signal.

12. A tracking control method for controlling a tracking position of first and second reproducing heads, respectively, which reproduce sequential and alternate signals recorded as a series of oblique parallel tracks on a recording medium, each of said tracks containing a pilot signal recorded therein having mutually different frequencies in adjacent tracks, said frequencies changing in cyclic sequence from track to track, each of said first and second reproducing heads having a sufficient length to extend across a respective target track to be reproduced and to overlap portions of adjacent tracks which are in preceding which are in preceding and following relations to each respective target track, said tracking control method comprising the steps of:
  producing first and second control signals which are respectively indicative of opposite displacements of said first reproducing head from a track to be traced;
  producing third and fourth control signals which are respectively indicative of opposite displacements of said second reproducing head from a track to be traced;
  generating first and second weighting coefficients K1 and K2, respectively, K1 and K2 being variable values;
  generating third and fourth weighting coefficients K3 and K4, respectively, K3 and K4 being variable values;
  calculating the values of said first and second weighting coefficients K1 and K2, respectively, such that the values of K1 and K2 selectively vary within a range of '0' to '1', where K1+K2=1), and such that the relationship $(\theta \cdot X_2/\lambda)$ approaches 1 and $X_x:X_1=K1:K2$, where $\theta$ is an azimuth angle of first and second recording heads that recorded said oblique parallel tracks, $\lambda$ is the recording wavelength, $X_2$ is the length by which said first reproducing head overlaps said preceding track and $X_1$ is the length by which said first reproducing head overlaps said following track;
  calculating the values of said third and fourth weighting coefficients K3 and K4, respectively, such that the values of K3 and K4 selectively vary within a range of '0' to '1', where (K3+K4=1), and such that the relationship ($\theta \cdot X_4/\lambda$) approaches 1 and $X_4:X_3=K3:K4$, where $\theta$ is an azimuth angle of first and second recording heads that recorded said oblique parallel tracks, $\lambda$ is the recording wavelength, $X_4$ is the length by which said second reproducing head overlaps said preceding track and $X_3$ is the length by which said second reproducing head overlaps said following track;

multiplying said first and second control signals by said first and second weighting coefficients, respectively, to produce first and second weighted control signals;

multiplying said third and fourth control signals by said third and fourth weighting coefficients, respectively, to produce third and fourth weighted control signals; and generating a first tracking error signal and a second tracking error signal from said first and second weighted control signals and said third and fourth weighted control signals, respectively, so that said first reproducing head is disposed in a tracking position according to said first tracking error signal and said second reproducing head is disposed in a tracking position according to said second tracking error signal.

* * * * *